(No Model.)  2 Sheets—Sheet 1.
A. SCHAFER.
REEL FOR HARVESTERS.
No. 269,121.  Patented Dec. 12, 1882.
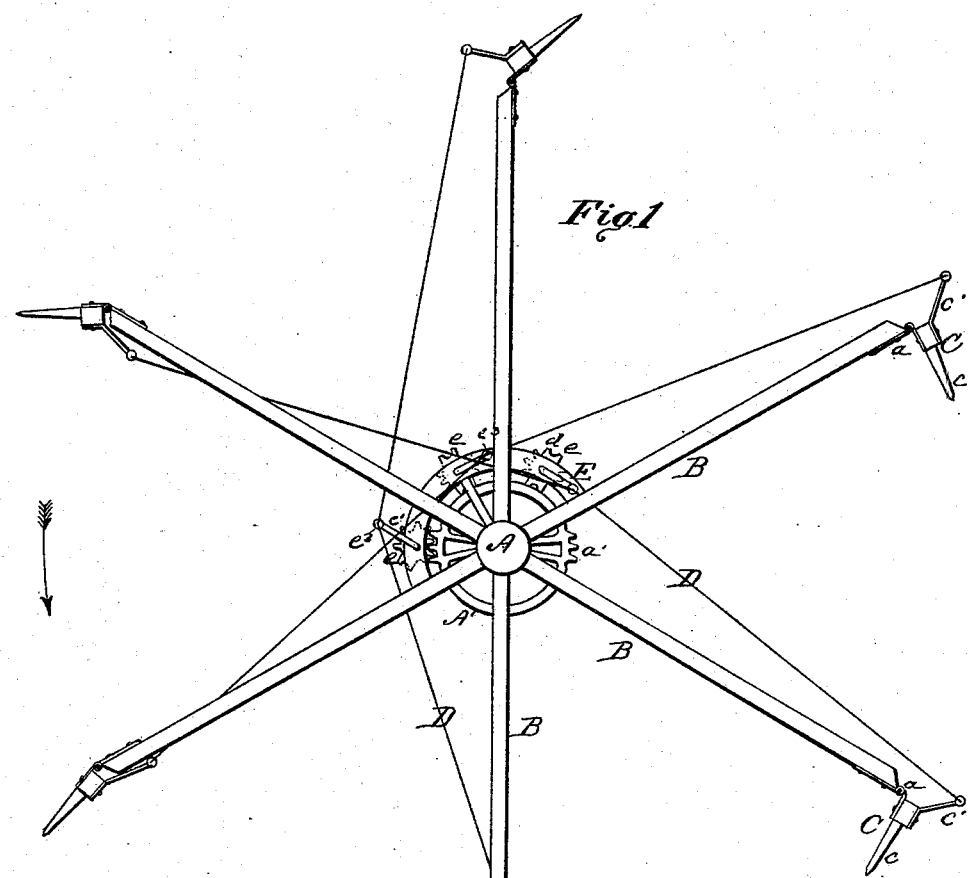
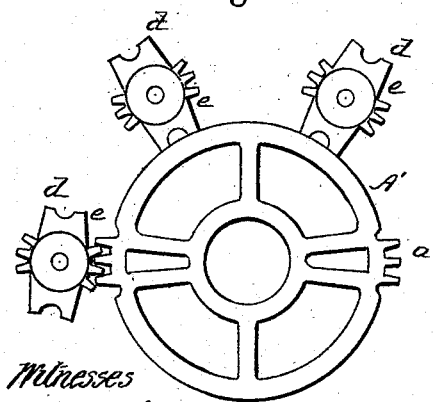
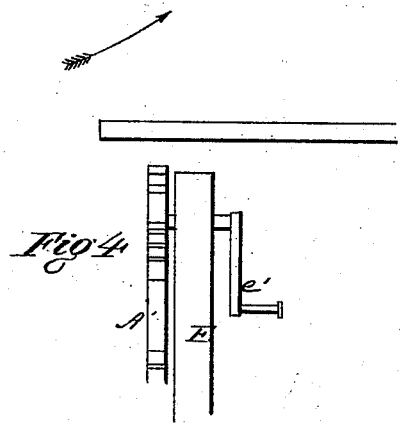
Witnesses
A. A. Connolly
J. C. Wildman
Adam Schafer
Inventor
by Connolly Bros (No Model.) 2 Sheets—Sheet 2.
A. SCHAFER.
REEL FOR HARVESTERS.
No. 269,121. Patented Dec. 12, 1882.
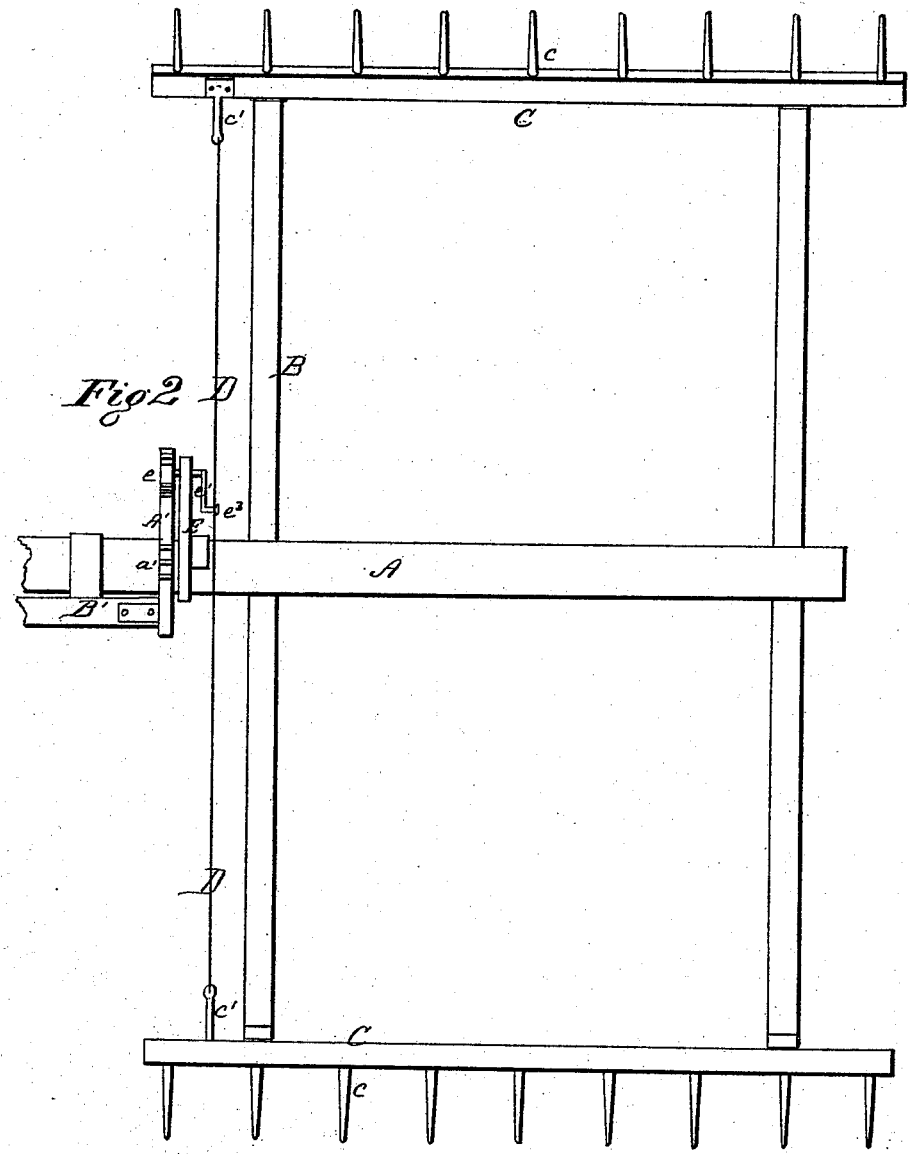

UNITED STATES PATENT OFFICE.

ADAM SCHAFER, OF MOUNT CARMEL, ILLINOIS.

REEL FOR HARVESTERS.

SPECIFICATION forming part of Letters Patent No. 269,121, dated December 12, 1882.

Application filed September 23, 1882. (No model.)

*To all whom it may concern:*

Be it known that I, ADAM SCHAFER, a citizen of the United States, residing at Mount Carmel, in the county of Wabash and State of Illinois, have invented certain new and useful Improvements in Reels for Harvesters; and I do hereby declare the following to be a full, clear, and exact description of the invention, reference being had to the accompanying drawings, which form part of this specification, in which—

Figure 1 is a side elevation of the reel. Fig. 2 is a front elevation. Fig. 3 is a side view enlarged, showing the relation of stop-motion pinions and wheel. Fig. 4 is an edge view of the same.

My invention has relation to rake-reels for harvesting-machines; and it consists in the novel construction and combination of mechanism for governing the movement of the jointed arms, whereby the latter are caused to bend downward, bring their points or extremities nearer the center of the reel as they enter the grain, thus raising up the fallen grain and drawing it toward the cutting parts of the harvester, and then, as the arms approach the cutter-bar, their extremities are thrown forward in such a manner as to pass over the cutter-bar without coming in contact with it.

Referring to the accompanying drawings, A represents the reel-shaft, to which are fastened in the ordinary manner the arms B. The arms B have fastened to them at their extremities, by means of hinges $a$, the rake-heads C, into which are inserted the teeth $c$. The rake-heads have attached to short arms $c'$ the rods D, arranged so that when controlled by mechanism to be hereinafter described the rakes are pulled when entering the grain and pushed back when passing over the guards, thus allowing of the use of light connecting rods or levers.

Attached to the reel-shaft, and turning with it, is the segment or semicircle E, carrying the pinions $e$, at equal distance apart, and located on the side nearest the driver. They are secured to the crank-shafts $e'$, which pass through E in such manner as to turn freely on their axes.

$A'$ is a wheel attached to the reel-supports $B'$, and formed with six cogs or teeth, $a'$, disposed in sets of three, located diametrically opposite each other. The intervening portions of the periphery or circumference of the wheel are smooth. The wheel is fastened to the reel-supports in such a manner that it can be adjusted to different positions of the rakes.

The "stop-motion" pinions are constructed with six cogs or teeth, arranged in sets of three diametrically opposite each other, three on a side, and are adapted to engage at intervals with the teeth of the wheel $A'$. The portions of the pinions intervening between the sets of teeth are occupied by long cogs $d$, which slide on the smooth portions of the wheel. While in the sliding position no vibratory motion is imparted to the rakes; but as the reel revolves the stop-motion pinions successively engage with the teeth on the wheel on one side thereof, and each rake is in turn thrown back so as to pass over the cutter-bar in a horizontal position. This position is maintained until the pinions come into engagement with the cogs or teeth on the opposite side of the wheel, when they are again turned and the rakes brought to a vertical position, so as to properly enter the grain.

As will be seen, the levers or rods D are connected to the crank-shafts $e'$ at $e^3$, so as to operate in conjunction therewith.

Having described my invention, I claim—

The toothed wheel $A'$, stop-motion pinions $e$, and the connecting-rods D, in combination with the jointed rakes, substantially as set forth.

In testimony that I claim the foregoing I have hereunto set my hand this 15th day of September, 1882.

ADAM SCHAFER.

Witnesses:
NOAH FRITZ,
D. A. KISTLER.